2 Sheets--Sheet 1.

E. H CUMMINGS.
Apparatus for Preparing and Distributing Liquid Manure.

No. 167,155. Patented Aug. 31, 1875.

Witnesses.

Inventor:
Ephraim H. Cummings

E. H CUMMINGS.
Apparatus for Preparing and Distributing Liquid Manure.

No. 167,155.

2 Sheets--Sheet 2.

Patented Aug. 31, 1875.

Witnesses.
F. L. Dieterich
S. S. Clark

Inventor:
Ephraim H. Cummings
By LaFayette Bingham & Co.
Attys.

UNITED STATES PATENT OFFICE.

EPHRAIM H. CUMMINGS, OF CHICAGO, ILLINOIS.

IMPROVEMENT IN APPARATUS FOR PREPARING AND DISTRIBUTING LIQUID MANURES.

Specification forming part of Letters Patent No. 167,155, dated August 31, 1875; application filed July 31, 1875.

*To all whom it may concern:*

Be it known that I, EPHRAIM H. CUMMINGS, of Chicago, in the county of Cook and State of Illinois, have invented an Improvement in Liquid Fertilizers, of which the following is a specification:

My invention consists of an apparatus for extracting and distributing liquid manure, all of which will be fully described in the following specification.

Figure 1:
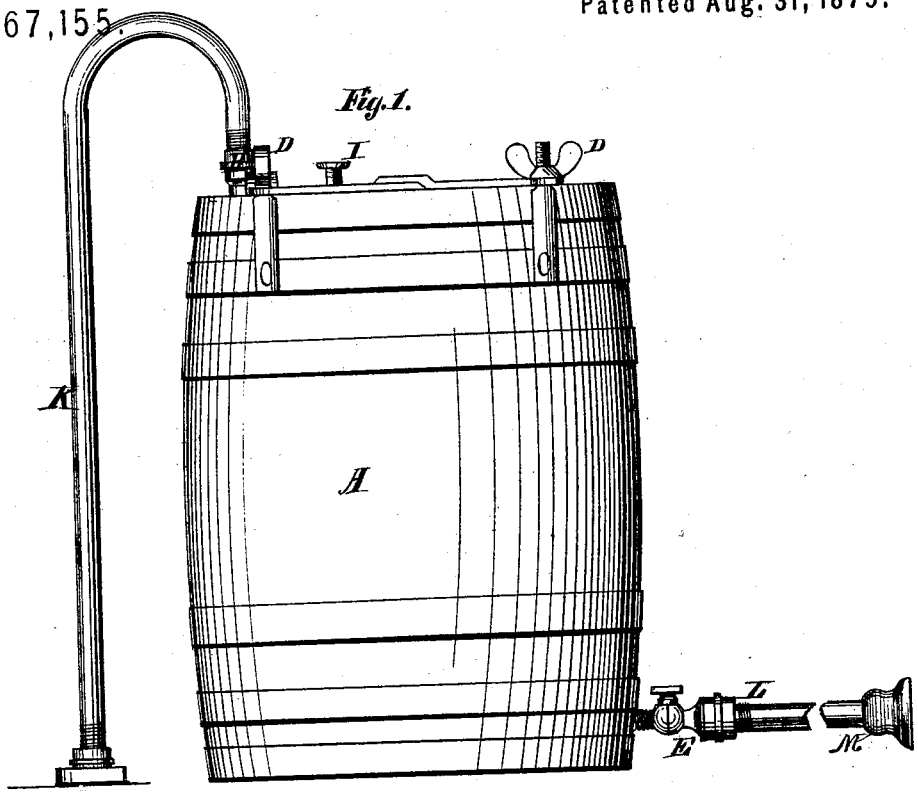
Figure 2:
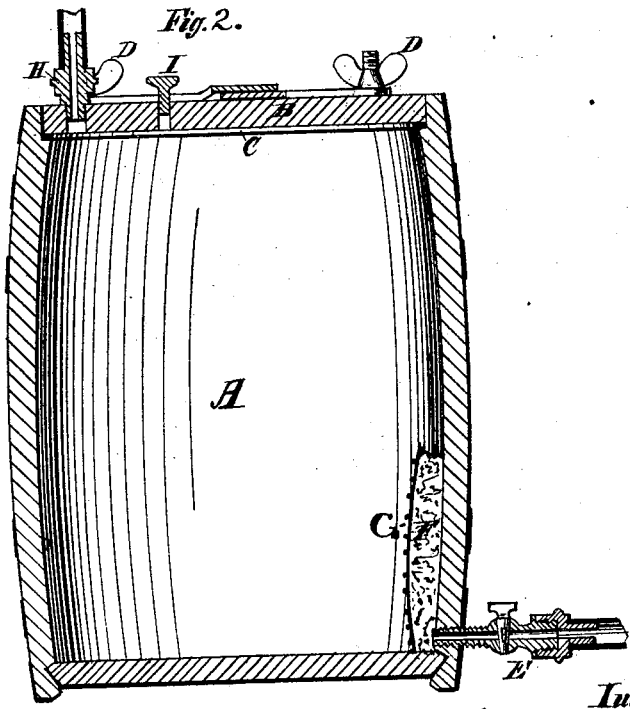
Figure 3:
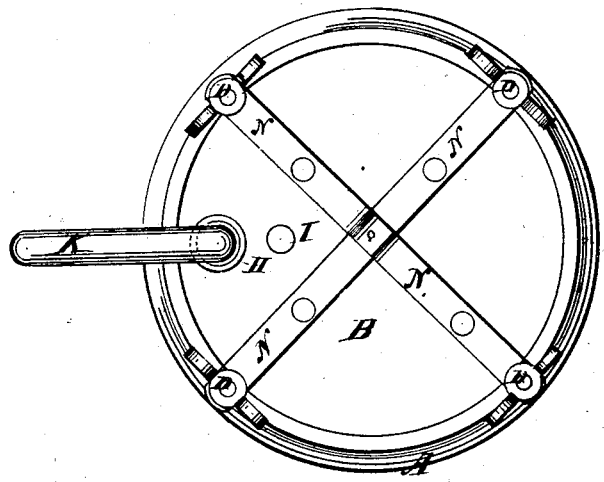
Figure 4:
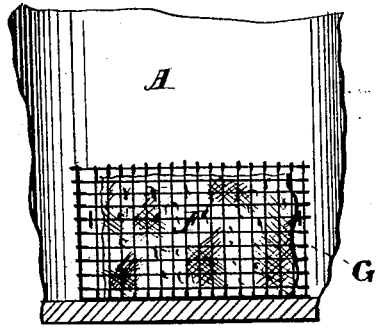

In the accompanying drawings, Figure 1 is a side view of my liquid fertilizer or apparatus. Fig. 2 is a vertical central section of the same. Fig. 3 is a top view. Fig. 4 is a detached view of the filter.

The object of my invention is to rapidly extract the fertilizing properties of manure, and to distribute the solution upon lawns, gardens, and in other places. This object I usually accomplish in one hour, after which the apparatus may be filled a second time. And I can operate upon a small or large quantity of manure with almost equal facility. In the application of my invention I usually employ a strong cask, A, which will bear a high pressure from a hydrant or other pressure water-pipe.

A screened filter, F, Fig. 4, is placed in the bottom of this cask A, loosely covering the discharge opening or passage to the hose L. This filter consists of a sponge, which is covered by a screen of woven wire or a perforated iron plate, as shown at G, Figs. 2 and 4. The wire of this screen should be about No. 8, and the meshes about one-fourth of an inch, so as to prevent the insoluble portions of the manure from pressing the sponge and clogging the same, thus obstructing the free discharge of water and juice of the manure. I find it most convenient for lawns to use a cask which holds, say, fifty gallons, and the cask may be arranged upon wheels, and thus made conveniently portable, if desired, or a larger and stationary chamber, A, may be used.

In filling the cask A it is usually best to throw some strawy manure in first, to cover the screened filter F, and then the cask may be filled and the manure packed down. The cover or head B of the cask should have a packing of india-rubber, as shown at C, so as to be water-tight when closed by the screw bolts and nuts D. The straps N are used to strengthen the head B, and prevent the same from warping or springing under the high pressure of the water in the cask when the hydrant-water is let on. A vent-plug, $i$, is used to let the air escape when the water is turned onto the manure. The cask or chamber A is also provided with a water-supply pipe, K, and screw-plug with stop-cock H, which should enter at or near the top, and also with a discharge-hose, L, and stop-cock E, attached to or near the bottom of cask A. This hose may have the common rose-sprinkler M, or any other desired nozzle.

It may be observed that this machine or apparatus will not work successfully if the manure be allowed to press directly upon the sponge or filter, for such pressure I find will pack the sponge too tightly upon the discharge-opening, and thus prevent the proper flow of water, and also burst the cask A when the full force of water is let onto the apparatus.

Having described my invention, I claim—

The combination of the manure-chamber A, the screened filter F G, the water-supply pipe K, and the discharge-hose L, for the purpose of extracting liquid manure and distributing the same, substantially as set forth.

In testimony that I claim the foregoing as my own invention I affix my signature in presence of two witnesses.

EPHRAIM H. CUMMINGS.

Witnesses:
A. T. GALT,
ELBRIDGE HANECY.